United States Patent [19]

Inoue

[11] 3,758,834

[45] Sept. 11, 1973

[54] MAGNETIC TAPE MOTOR DRIVE CONTROL APPARATUS FOR MAGNETIC TAPE RECORDERS

[75] Inventor: Hideo Inoue, Tokyo, Japan

[73] Assignee: Teac Corporation, Tokyo, Japan

[22] Filed: Feb. 22, 1972

[21] Appl. No.: 228,111

[30] Foreign Application Priority Data

| | | |
|---|---|---|
| Feb. 23, 1971 | Japan | 46/8539 |
| Feb. 23, 1971 | Japan | 46/8540 |
| Feb. 27, 1971 | Japan | 46/9822 |

[52] U.S. Cl. .......... 318/6, 318/7, 318/162

[51] Int. Cl. .......... H02p 1/56

[58] Field of Search .......... 318/6, 7, 162

[56] References Cited

UNITED STATES PATENTS

| | | | |
|---|---|---|---|
| 2,834,928 | 5/1958 | Carter | 318/162 |
| 3,392,315 | 7/1968 | Schwartz | 318/162 |
| 3,585,475 | 6/1971 | Ban | 318/162 X |
| 3,218,529 | 11/1965 | Evans et al. | 318/7 |
| 2,854,856 | 10/1958 | Oppen | 318/162 X |
| 3,244,955 | 4/1966 | Turner et al. | 318/162 X |

*Primary Examiner*—T. E. Lynch
*Attorney*—Marshall & Yeasting

[57] ABSTRACT

A magnetic tape drive control apparatus for magnetic tape recorders adapted such that when an operation is effected for starting a magnetic tape from its standstill condition, a plunger solenoid for bringing a pinch roller into or out of rotary contact with a capstan is energized after the capstan has reached a constant-speed revolving condition and that when an operation is achieved for changing the direction of travel of the magnetic tape from left to right, the plunger solenoid is deenergized from the time of the tape direction changing operation until the capstan comes to turn from anticlockwise to clockwise at a constant speed. In the magnetic tape drive control apparatus means for changing the direction of travel of the magnetic tape is controlled with a relay circuit, the relay circuit is energized with an output from a switching transistor having a charging capacitor connected to the input side thereof and the charging capacitor is shorted by a normally open contact which is closed by a conductive foil attached to the magnetic tape.

6 Claims, 3 Drawing Figures

MAGNETIC TAPE MOTOR DRIVE CONTROL APPARATUS FOR MAGNETIC TAPE RECORDERS

BACKGROUND OF THE INVENTION

1. Field of the Invention

This invention relates to a magnetic tape drive control apparatus for magnetic tape recorders which is adapted such that when an operation for driving a magnetic tape in a first direction (hereinafter referred to as a rightward direction for the convenience of a better understanding) is achieved by some means or automatically, a capstan is revolved in a first direction (hereinafter referred to as anticlockwise for the convenience of a better understanding) and a pinch roller is brought by energization of its plunger into rotary contact with the capstan with the magnetic tape being gripped therebetween to drive the magnetic tape to right and that when an operation for the reversal of the tape drive from the first direction to a second one (hereinafter referred to as a leftward direction for the convenience of a better understanding) is carried out by some means or automatically, the capstan is revolved in a second direction (hereinafter referred to as clockwise for the convenience of a better understanding) and the pinch roller is brought by energization of its plunger into rotary contact with the capstan with the tape being gripped therebetween to drive the tape to left.

2. Description of the Prior Art

There has heretofore been proposed a magnetic tape drive control apparatus of this kind in which when an operation is achieved for reversing the magnetic tape from its leftward (or rightward) travelling direction to a rightward (or leftward) one by some means or automatically, the anticlockwise (or clockwise) revolution of the capstan is altered to the clockwise (or anticlockwise) revolution. In the conventional apparatus the reversal of the revolving direction of the capstan is effected while the pinch roller is in the rotary contact with the capstan. Therefore, the pinch roller acts as a load on the capstan, so that the time for the capstan coming to revolve clockwise at a constant speed is relatively long. Further, until the capstan reaches the constant-speed revolution, signals are recorded on the tape or reproduced therefrom, and accordingly there is the possibility that recording or reproducing at a normal tape speed cannot be achieved.

For avoiding generation of noise from the revolution of the capstan while the pinch roller is out of contact therewith to hold the tape in its standstill condition, it has been proposed to stop the revolution of the capstan all this while. In such a case, however, when the pinch roller is brought into rotary contact with the capstan immediately after an operation is carried out for starting the tape from its standstill condition to travel to right or left, that is, for providing a playing condition, the pinch roller gets in rotary contact with the capstan before the latter reaches a constant-speed stable revolving condition. Therefore, the tape speed is not stable for a certain period of time at the start of travel of the tape but, also in such a period, signals are recorded on the tape or reproduced therefrom. Thus, there is the possibility that recording or reproducing at a normal tape speed cannot be effected.

SUMMARY OF THE INVENTION

Accordingly, the present invention has for its object to provide a novel magnetic tape drive control apparatus for magnetic tape recorders in which the pinch roller is disengaged from the drive capstan during acceleration of the capstan.

DESCRIPTION OF THE PREFERRED EMBODIMENT

Figure 1:
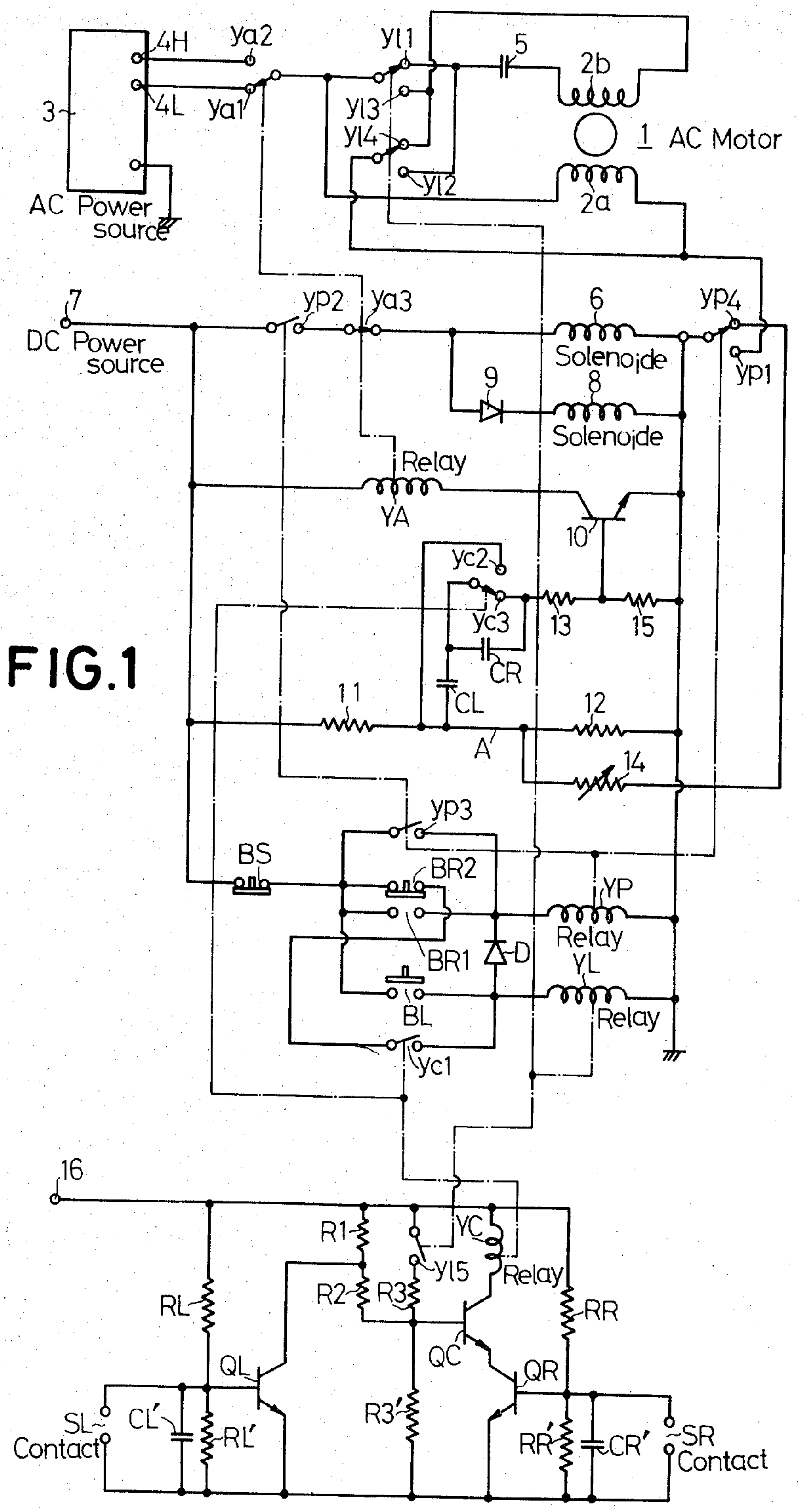
FIG. 1 is a circuit diagram showing one example of this invention.

In FIG. 1 reference numeral 1 indicates an AC motor coupled with a capstan (not shown), which motor has main and auxiliary windings 2*a* and 2*b*. One end of the main winding 2*a* is connected through a normally closed contact yal of an acceleration control relay YA described later to a hot terminal 4L of an AC power source 3 and through a normally open contact *ya*2 of the control relay YA to a hot terminal 4H at which is derived a voltage higher than that obtainable at the terminal 4L, while the other end of the main winding 2*a* is grounded through a normally open contact *yp*1 of a relay for play YP described later. One end of the auxiliary winding 2*b* is connected to the terminal 4L through a phase advancing capacitor 5, a normally closed contact *y*11 of a reversing relay YL described later and the normally closed contact *ya*1 of the accelerating relay YA and to the terminal 4H through the capacitor 5, the normally closed contact *y*11 of the reversing relay YL and the normally open contact *ya*2 of the accelerating relay YA and is grounded through the capacitor 5, a normally open contact *yl*2 of the relay YL and the normally open contact *yp*1 of the play relay YP, while the other end of the auxiliary winding 2*b* is connected to the terminal 4L through a normally open contact *yl*3 of the reversing relay YL and the normally closed contact *ya*1 of the accelerating relay YA and to the terminal 4H through the normally open contact *yl*3 of the reversing relay YL and the normally closed contact *ya*2 of the accelerating relay YA and is grounded through a normally closed contact *y*14 of the reversing relay YL and the normally open contact *yp*1 of the play relay YP.

Reference numeral 6 designates a solenoid for actuating a plunger (not shown) coupled with a pinch roller (not shown) to bring the latter into rotary contact with the capstan. The solenoid 6 is connected at one end through a normally closed contact *ya*3 of the accelerating relay YA and a normally open contact *yp*2 of the play relay YP to a DC power source terminal 7 at which is derived a relatively high DC voltage, and is grounded at the other end.

Reference numeral 8 identifies a solenoid for taking off the braking of a brake (not shown) applied to reel shafts (not shown) carrying reels which have wound thereon a magnetic tape. The solenoid 8 is connected in parallel with the solenoid 6 through a forward diode 9.

The aforementioned motor 1 and the solenoids 6 and 8 are controlled by energization and deenergization of the relays YP, YL and YA to be operative or energized or inoperative or deenergized, thereby to control the travelling of the magnetic tape.

Namely, one end of the coil of the play relay YP is connected to the power source terminal 7 through a normally open push-button switch BR1 which is depressed for rightward tape translation and through a normally closed push-button switch BS for stopping the tape translation, while the other end of the coil of the relay YP is grounded. Connected in parallel with the switch BR1 is a normally open contact *yp*3 for self-maintenance of the play relay YP.

One end of the coil of the reversing relay YL is connected to the power source terminal 7 through a normally open push-button switch BL which is depressed for leftward tape translation and through the stop switch BS, while the other end of the coil of the relay YL is grounded. Connected in parallel with the switch BR1 is a series circuit of a normally closed push-button switch BR2 ganged with the switch BR1 and a normally open contact *yc*1 of a control relay YC described later on. Further, the switch BL of the reversing relay YL and the contact *yc*1 are connected at the end to the switch BR1 of the play relay YP and the contact *yp*3 through a diode D connected in a forward direction.

The accelerating relay YA is connected at one end to the power source terminal 7 and grounded at the other end through the collector and emitter of an NPN-type switching transistor 10. Between the power source terminal 7 and ground a series circuit of resistors 11 and 12 is connected and the connection point A therebetween is connected to the base of the transistor 10 through capacitors CL and CR and, if necessary, through a resistor 13 and, at the same time, grounded through a resistor 14 and the normally closed contact *yp*4 of the play relay YP. Further, the capacitors CL and CR are adapted to be short-circuited through a normally open contact yc2 and a normally closed contact *yc*3 of a control relay YC respectively. In this case, it is preferred to connect a resistor 15 between the base of the transistor 10 and ground.

Reference character QL designates an NPN-type switching transistor which is changed over to the off state from the on state by closing of a normally open contact SL for leftward tape translation which is adapted to be closed by a conductive foil for leftward tape translation attached to the magnetic tape while the tape is travelling to right. Reference character QR indicates an NPN-type switching transistor which is changed over to the off state from the on state by closing a normally open contact SR for rightward tape translation which is adapted to be closed by a conductive foil for rightward tape translation attached to the magnetic tape while the tape is travelling to left. The former transistor QL has the base connected to the connection point of a resistor RL and a charging capacitor CL′ connected in series between a DC power source terminal 16 of a relatively low voltage and ground, the emitter grounded and the collector connected to the power source terminal 16 through a resistor RL. While, the latter transistor QR has the base connected to the connection point of a resistor RR and a changing capacitor CR′ connected in series between the power source terminal 16 and ground, the emitter grounded and the collector connected to the emitter of another NPN-type switching transistor QC. In this case, one end of the series circuit of the resistor RL and the capacitor CL′ on the side of the latter is grounded and one end of the series circuit of the resistor RR and the capacitor CR′ on the side of the latter is also grounded and normally open contact SL and SR are connected in parallel with the capacitors CL′ and CR′ respectively. In this case, it is also possible to connect resistors RL′ and RR′ in parallel with the capacitors CL′ and CR′ respectively.

The base of the transistor QC is connected to the collector of the transistor QL, if necessary, through a resistor R2 and to the power source terminal 16, if necessary, through a resistor R3 of a relatively low resistance value and a normally open contact y15 of the aforementioned relay YL and the collector of the transistor QC is connected to the power source terminal 16 through the coil of the relay YC having the aforesaid contacts *yc*1 to *yc*3. In this case, a resistor R3′ may also be connected between the base of the transistor QC and ground.

The foregoing has outlined the construction of one example of this invention and the following will describe the operation of the above example.

Figure 2:
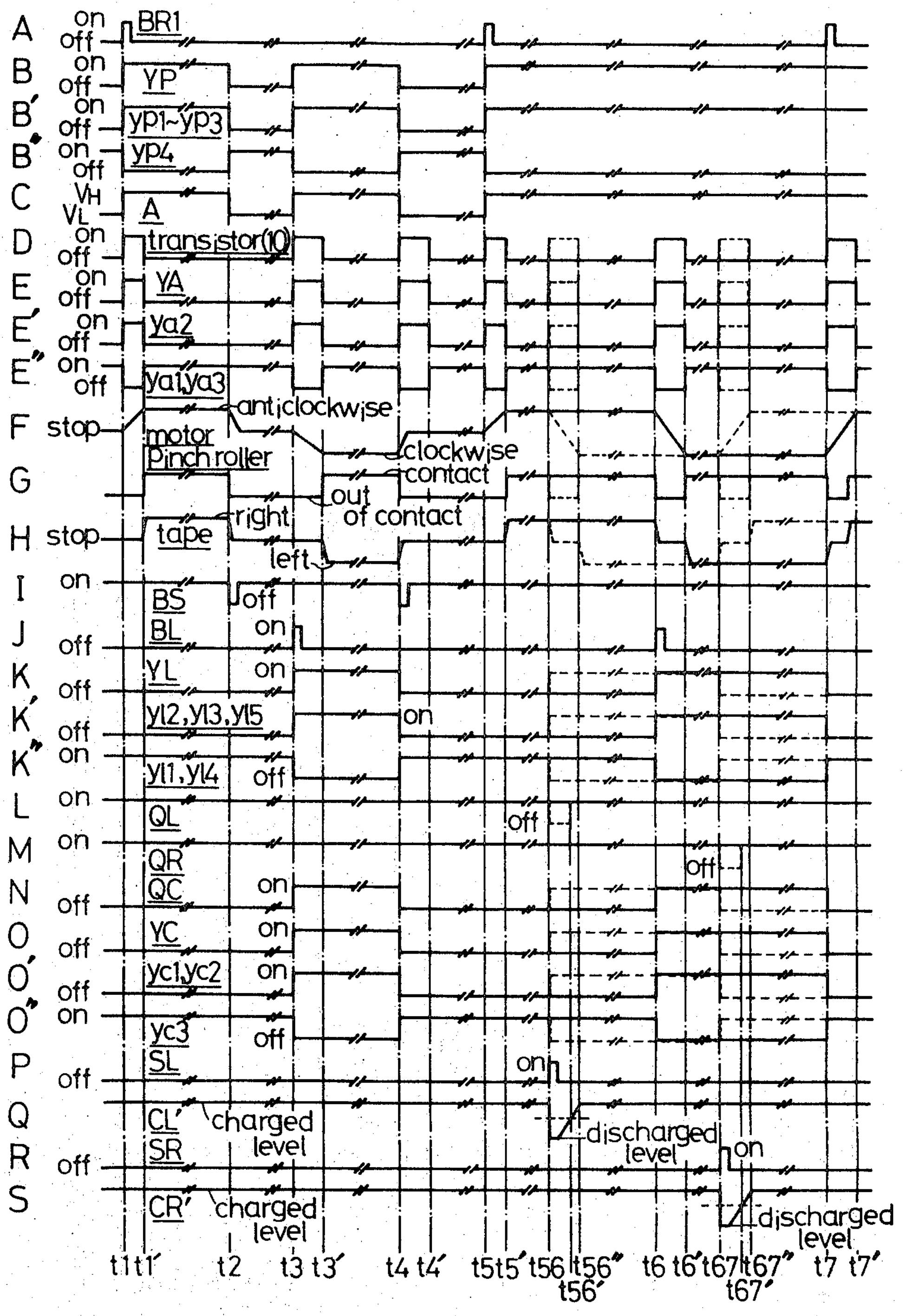
FIG. 2 is a series of waveform diagrams, for explaining the operation of the example of FIG. 1.

Depressing the push-button switch BR1 at a time *t*1 as shown in FIG. 2A, a current from the power source terminal 7 is supplied to the play relay YP through the switches BS and BR1 to energize the play relay YP as depicted in FIG. 2B, thereby closing the contacts *yp*1 to *yp*3 as depicted in FIG. 2B′ and opening the contact *yp*4 as shown in FIG. 2B″. As a result of this, the play relay YP is self-maintained by the contact *yp*3 after the time *t*1. While, the contact *yp*4 is open from the time *t*1, so that the resistor 14 is connected in parallel with the resistor 12 is disconnected therefrom at the time *t*1 and the voltage at the connection point A of the resistors 11 and 12 rises from a value $V_L$ before the time *t*1 to a higher value $V_H$ as illustrated in FIG. 2C. Consequently, a charging current flows to the capacitor CL in response to the difference between the voltages $V_H$ and $V_L$ and the transistor 10 is thereby turned on immediately at the time *t*1 as shown in FIG. 2D to energize the relay YA immediately at the time *t*l as depicted in FIG. 2E. Thereafter, when the charging current to the capacitor CL stops or its level becomes lower than a predetermined value at a time *t*1′, the transistor 10 is turned off at the time *t*1′ and the accelerating relay YA becomes deenergized from the time *t*1′, so that, between the times *t*1 and *t*1′, the contacts *ya*1 and *ya*3 of the accelerating relay YA are in the off state as shown in FIG. 2E″ and the contact *ya*2 in the on state as shown in FIG. 2E′.

The contact *yp*1 of the play relay YP is turned on from the time *t*1 and the contacts *ya*1 and *ya*3 of the accelerating relay YA are in the off state and in the on state respectively between the times *t*1 and *t*1′, to energize the main winding 2*a* by current flow from terminal 4H through contacts *ya*2 and *yp*1 and to energize the auxiliary winding through capacitor 5 and reversing relay contacts yl1 and *y*l4. so that and the motor 1 is started anticlockwise from a standstill condition at time *t*1 with a high voltage derived from the power source terminal 4H and the motor 1 accelerates, as shown in FIG. 2F. At the same time, the contact *ya*3 of the relay YA is open between the times *t*1 and *t*1′, so that even if the contact *yp*2 of the play relay YP is closed from the time *t*1, the solenoid 6 is not energized.

At the time *t*1′ the contacts *ya*1 and *ya*2 of the relay YA are turned on and off respectively to energize with the reduced voltage from the power source terminal 4L. At this time, the contact *ya*3 of the accelerating relay YA is closed from the time *t*1′ to energize the pinch roller solenoid 6 and brake release solenoid 8 by which is the pinch roller is brought into rotary contact with the capstan from the time $t1'$ as depicted in FIG. 2G and, at the same time, remove the braking that had been applied to the reel shafts.

Accordingly, by suitable selection of the resistance value of the resistor 14, the capacitance value of the capacitor CL, the resistance value of the resistor 13 and so on and by suitable establishment of the time interval from the time $t1$ to $t1'$, it is possible to bring the pinch roller into rotary contact with the capstan immediately before or after the latter has reached its constant-speed anticlockwise revolving state, so that the magnetic tape is immediately caused to travel to right from the time $t1'$, as depicted in FIG. 2H.

Depressing the stop push-button switch BS at a time $t2$ as shown in FIG. 2I after the tape has been brought in its rightward travelling condition, the self-maintenance circuit of the relay YP with the contact $yp3$ is cut off to deenergize the play relay YP to turn off its contacts $yp1$ to $yp3$ and on its contact $yp4$, by which the aforementioned closed loop including the windings $2a$ and $2b$ of the motor 1 is cut off from the time $t2$, so that the revolving speed of the motor 1 lowers to zero relatively in a short time as depicted in FIG. 2F. At the same time, the aforesaid closed loop for the solenoids 6 and 8 is also cut off from the time $t2$ to bring the pinch roller out of rotary contact with the capstan from the time $t2$ as shown in FIG. 2G, with the result that the tape comes to a rest immediately after the time $t2$ and remains in a standstill after releasing the switch BS, as illustrated in FIG. 2H. The voltage at the connection point A of the resistors 11 and 12 becomes the lower voltage $V_L$ from the time t2.

Upon depression of the reverse run push-button switch BL at a time t3 as shown in FIG. 2J after the tape has thus been brought in its standstill condition, the power source terminal 7 is connected through the switches BS and BL to the reversing relay YL to energize it from the time $t3$ as depicted in FIG. 2K, turning on its contacts $yl2$, $yl3$ and $yl5$ as shown in FIG. 2K' and off its contacts $yl1$ and $yl4$ as depicted in FIG. 2K''. At the same time, the power source terminal 7 is connected through the switches BS and BL and the diode D to the play relay YP to energize it to turn on its contacts $yp1$ to $yp3$ as above mentioned and off its contact $yp4$, so that the play relay YP is self-maintained with the contact $yp3$. At the same time, the transistors QL and QR are normally in the on state as shown in FIGS. 2L and 2M because their bases are supplied with charging voltages across the capacitors CL' and CR' connected to the power source terminal 16 through resistors RL and RR respectively and, therefore, the collector voltage of the transistor QL is lower than the voltage at the power source terminal 16 by a drop voltage across the resistor R1 and the voltage is applied to the base of the transistor QC. Accordingly, the transistor QC is normally in the off state as depicted in FIG. 2N but a high voltage nearly equal to that at the power source terminal 16 is applied by the closing of the contact $yl5$ to the base of the transistor QC to turn on the transistor QC from the time $t3$. Therefore, a current is supplied from the power source terminal 16 through the collectors and emitters of the transistors QC and QR to the control relay YC to energize it from the time $t3$ as shown in FIG. 2O to turn on its contacts $yc1$ and $yc2$ as depicted and FIG. 2O' and off its contact $yc3$ as shown in FIG. 2O'', thus maintaining the reversing relay YL in the energized condition with a circuit including the switches BS and BR2 and the contact $yc1$.

As a result of this, the voltage at the connection point A of the resistors 11 and 12 changes from $V_L$ to $V_H$ from the time t3 based upon the off state of the contact $yp4$ in the same manner as previously described. While, the capacitor CL is shorted by the contact $yc2$ but the capacitor CR is caused by the contact $yc3$ to be non-shorted and a charging current flows to the capacitor CR based upon the voltage $V_H$, by which the transistor 10 is immediately turned on from the time $t3$ as shown in FIG. 2D to energize the accelerating relay YA at the same time as depicted in FIG. 2E. Thereafter, when the charging current to the capacitor CR stops or its level lowers than a predetermined value from a time $t3'$, the transistor 10 is turned off from the time $t3'$ to deenergize the accelerating relay YA, so that its contacts $ya1$ and $ya3$ are in the off state and the contact $ya2$ in the on state between the times $t3$ and $t3'$ as depicted in FIGS. 2E' and 2E'' respectively.

The contact $yp1$ of the play relay YP remains closed after the time $t3$ and the contacts $ya1$ and the contacts $ya2$ of the accelerating relay YA remain open and close between the times $t3$ and $t3'$, so that, between the times $t3$ and $t3'$, the motor 1 is energized in reverse, thereby starting the motor 1 clockwise from the time $t3$ based on the voltage at the power source terminal 4H as shown in FIG. 2F. While, the contact $ya3$ of the accelerating relay YA remains open between the times $t3$ and $t3'$, so that even if the contact $yp2$ of the play relay YP is turned on from the time $t3$, the solenoid 6 is not energized.

At the time $t3'$the contacts $ya1$ and $ya2$ of the relay YA are turned on and off respectively to energize the motor at reduced voltage and the motor revolves clockwise with the voltage from the power source terminal 4L. While, the contact $ya3$ of the accelerating relay YA is closed from the time $t3'$, so that the pinch roller is brought into rotary contact with the capstan from the time $t3'$ as depicted in FIG. 2G and, at the same time, the braking to the reel shafts is removed.

Accordingly, if the resistance values of the resistors 14 and 13 and the capacitance values of the capacitors CL and CR are suitably preselected, the pinch roller is brought into rotary contact with the capstan immediately after the latter has reached its constant-speed clockwise revolving state, so that the tape is immediately driven to left at a constant speed after the time $t3'$ as shown in FIG. 2H. In this case, however, the time from t3 to $t3'$is longer than that from $tl$ to $t1'$ because the charging current flows to the capacitor CR which has been short-circuited before the time $t3$.

Upon depression of the stop push-button switch BS at a time t4 after the tape has thus been brought in its leftward travelling condition, the self-maintenance circuit of the play relay YP with the contact $yp3$ and the circuit for maintaining the energization of the reversing relay YL with the contact $yc1$ are respectively cut off to deenergize the relays YP and YL respectively, turning off the contacts $yp1$ to $yp3$, on the $yp4$, off the contacts $yl2$, $yl3$ and $yl5$ and on the contacts $yl1$ and $yl4$. As a result of this, the rotation of the motor 1 stops from a time a little after the time $t4$ and the solenoids 6 and 8 are deenergized from the time $t4$, so that the pinch roller is disengaged from the capstan from the time $t4$ and, at the same time, bracking is put on the reel shafts. While, the transistor QC is turned off to deenergize the relay YC to open its contacts $yc1$ and $yc2$ and close its contact $yc3$, by which the tape is stopped and remains in a standstill after releasing the stop switch BS. The voltage at the connection point A becomes the lower voltage $V_L$ from the time $t4$ and charge stored in the capacitor CR to the time t4 is discharged through the contact $yc3$ but the capacitor CL is charged based upon the voltage $V_L$. Based upon the charging current, the transistor 10 is turned on at the time $t4$ and when the charging current becomes zero or its level becomes lower than a predetermined value from a time $t4'$, the transistor 10 is turned off to deenergize the accelerating relay YA between the times $t4$ and $t4'$, thereby closing the contact $ya2$ and opening the contacts $ya1$ and $ya3$. However, from the time $t4$ the play relay YP remains deenergized to hold its contacts $yp1$ and $yp2$ open, so that the solenoids 6 and 8 are not energized. In the case where the capacitance values of the capacitors CL and CR are equal to each other (hereinafter regarded as equal to each other), the time between $t3$ and $t3'$ is equal to that between $t4$ and $t4'$.

Depressing the switch BR1 at a time $t5$ after the tape has thus been brought in its standstill condition, the play relay YP is energized from the time $t5$ in the same manner as above described, thus closing its contacts $yp1$ to $yp3$ and opening its contact $yp4$. While, between the times $t5$ and $t5'$, the transistor 10 is in the on state to energize the relay YA to close its contact $ya2$ and open its contacts $ya1$ and $ya3$ in the same manner as previously described. After the time $t5'$ the transistor 10 is in the off state to hold the accelerating relay YA deenergized with the contact ya2 open and the contacts $ya1$ and $ya3$ closed. After all, the motor 1 starts to revolve anticlockwise from the time $t5$ and the pinch roller gets into rotary contact with the capstan from the time $t5'$, by which the tape is driven to right at a constant speed immediately after the time $t5'$. Upon depression of the switch BL at a time t6 during such constant-speed rightward tape translation, the reversing relay YL is energized to close its contacts $yl2$, $yl3$ and $yl5$ and open its contacts $yl1$ and $yl4$ and the transistor QC is turned on to energize the relay YC, closing its contacts $yc1$ and $yc2$ and opening its contact $yc3$. From the time $t6$ to $t6'$ (the time between which is equal to that between $t4$ and $t4'$), the transistor 10 remains in the on state to hold the accelerating relay YA energized with its contact $ya2$ closed and its contacts $ya1$ and $ya3$ open. From the time $t6'$ the transistor 10 is in the off state to retain the accelerating relay YA in its deergized condition with the contact $ya2$ open and those $ya1$ and $ya3$ closed and the solenoids 6 and 8 are energized from the time $t6'$, so that the motor 1 is driven clockwise from the time $t6$ and the pinch roller remains out of contact with the capstan between the times $t6$ and $t6'$ but in rotary contact therewith from the time $t6'$. After all, the tape stands still between the times $t6$ and $t6'$ and starts to run from the time $t6'$ and this tape translation is held by the continuous energization of the play and reversing relays YP and YL with the contacts $yp3$ and $yc1$. In this case, by the pressing of the switch BL at the time $t6$, the current is applied from the power source terminal 7 to the play relay YP through the switch BL and the diode D but the reversing relay YL remains energized from the time $t5$ and its energization is not affected by the current supply.

Depressing the switch BR1 at a time $t7$ during such leftward tape translation, the switch BR2 is turned off, so that the circuit for maintaining energization of the reversing relay YL with the contact $yc1$ is cut off to deenergize the relay YL, opening its contacts $yl2$, $yl3$ and yl5 and closing those $yl1$ and $yl4$ and the transistor QC is also turned off to deenergize the control relay YC to open its contacts $yc1$ and $yc2$ and close the contact $yc3$. However, the self-maintaining circuit of the relay YP is not cut off and, between the time $t7$ and $t7'$ (the time therebetween is equal to that between $t6$ and $t6'$), the transistor 10 and the accelerating relay YA are in the on state and from the time $t7'$ the transistor 10 and the relay YA are in the off state. From the time $t7'$ the solenoids 6 and 8 are energized and from the time $t7$ the motor 1 is driven anticlockwise and the pinch roller is out of contact with the capstan between $t7$ and $t7'$ and gets into rotary contact with the latter from the time $t7'$. Thus, the tape stands still between $t7$ and $t7'$ and then starts to travel to right from the time $t7'$.

With sequential depression of the switches BL and BR2, the tape is altered from the rightward travelling condition to the leftward one through the temporary standstill condition and from the leftward travelling condition to the rightward one through the temporary standstill condition similarly. Then, depressing the switch BS, the tape stops.

The foregoing description has been given in connection with the case in which the tape translation is controlled by the depression of the switches BR1 and BR2, BL and BS. In the foreging, although the capacitor CL' is normally changed with the voltage of the power source terminal 16, as shown in FIG. 2Q, to derive a high voltage across it to thereby hold the transistor QL in the on state as previously described. When the normally open contact SL is closed with the conductive foil attached to the tape, for example, at a time t56 between t5' and t6 as shown in FIG. 2P while the tape is driven to right, the charge stored in the capacitor CL' is rapidly discharged through the contact SL and the conductive foil. As a result of this, the transistor QL is turned off a little after the time $t56$ as indicated by a broken line in FIG. 2L to cause an increase in its collector voltage, while the transistor QC is turned on as indicated by a broken line in FIG. 2N. Thus, the control relay YC is energized as indicated by a broken line in FIG. 2O to close its contacts $yc1$ and $yc2$ as indicated by a broken line in FIG. 2O' and open its contact yc3 as indicated by a broken line in FIG. 2O'' and the reversing relay YL is also energized as indicated by a broken line in FIG. 2K to close its contacts $y$ 12, $yl3$ and $yl5$ and open its contacts yl1 and yl4 as indicated by broken lines in FIGS. 2K' and 2K'' respectively. Therefore, as is the case with the operation after the time $t6$ previously described, the transistor 10 is in the on state from a time a little after the time $t56$ to a time $t56'$ as indicated by a broken line in FIG. 2D to energize the accelerating relay YA for the same period, as indicated by a broken line in FIG. 2E, holding its contact $ya2$ open and its contacts yal and $ya3$ closed as indicated by broken lines in FIGS. 2E' and 2E''. The motor 1 is driven clockwise from a time a little after the time $t56$ as indicated by a broken line in FIG. 2F and the pinch roller is held out of contact with the capstan from a time a little after the time $t56$ to the time $t56'$ as indicated by a broken line in FIG. 2G. Accordingly, the tape rapidly comes to a standstill from the time $t56$ automatically without depression of the switch BS and rapidly starts to travel to left from the time $t56''$. Thus, the tape is altered from its leftward travelling condition to its rightward one. In the case, even if the conductive foil attached to the tape rapidly passes over the contact SL, the capacitor CL′ is gradually charged through the resistor RL and the charging voltage reaches a predetermined level for the conduction of the transistor QL at the time t56″ fully after the time t56, so that the transistor QL can be held in the off state for a relatively long time. This ensures a series of sequential steps: cut off of the transistor QL based upon closing of the contact SL — conduction of the transistor QC — energization of the control relay YC — changeover of closing and opening of its contacts. Accordingly, the operation for changeover from the rightward tape translation to the leftward one can be automatically achieved without fail.

Assume that the switch BL is not depressed at the time t6 during the leftward tape travel started from the time a little after the time t56′. In such a case, when the normally open contact SR is closed with the conductive foil of the tape, for example, at a time t67 between t6′ and t7 as depicted in FIG. 2R, charge stored in the capacitor CR′, which is normally charged with the voltage from the power source terminal 16 as shown in FIG. 2S to derive a high voltage across it for holding the transistor QR in the on state, is rapidly discharged through the contact SL and the conductive foil, turning off the transistor QR a little after the time t67 as indicated by a broken line in FIG. 2M. As a result of this, the transistor QC having been in the on state is turned off as indicated by a broken line in FIG. 2N and the control relay YC is deenergized as indicated by a broken line in FIG. 2C, thereby to open its contacts yc1 and yc2 and close its contact yc3 as indicated by broken lines in FIGS. 2O′ and 2O″ respectively. Based upon this, the reversing relay YL is deenergized as indicated by a broken line in FIG. 2K to open its contacts yl2, yl3 and yl5 and close those yl1 and yl4 as indicated by broken lines in FIGS. 2K′ and 2K″ respectively. Accordingly, as is the case with the aforementioned operation from the time t7, the transistor 10 is in the on state from a time a little after the time t67 to a time 67″ as indicated by a broken line in FIG. 2D and the accelerating relay YA is energized for the same period of time. Thus, the motor 1 is driven anticlockwise from the time a little after the time t67 and the pinch roller is held out of contact with the capstan from the time a little after the time t67 to the time t67″. Consequently, the tape rapidly comes to a standstill from the time t67 automatically without depression of the switches BR1 and BR2 and starts to right immediately from the time t67″. In this manner, the leftward tape translation is changed over to the rightward one. Also, in this case, the transistor QR can be held in the off state for a relatively long time due to the presence of the capacitor CR′ as in the above case, so that it is possible to achieve a series of sequential steps: cut off of the transistor QR based upon closure of the contact SR — nonconduction of the transistor QC — deenergization of the control relay YC — changeover of closing and opening of its contacts, thus ensuring automatic reversal of the tape translation from left to right.

With sequential closing of the normally open contacts SL and SR with the conductive foil of the tape, the tape is automatically brought in its leftward travelling condition from its rightward travelling one and vice versa repeatedly without depression of the switches BL, BR1 and BR2. Then, upon depression of the switch BS, the tape stops and such repetitive operation also stops.

With the foregoing arrangement, it is possible to avoid the possibility of recording or reproduction of signals on or from the tape at an abnormal speed at the time of reversal of the direction of the tape translation from right (or left) to left (or right). The above operation is achieved based upon the charging current supplied to the capacitor from the time when the operation for reversal of the direction of the tape travel as above described, so that the operation is carried out with accuracy.

Figure 3:
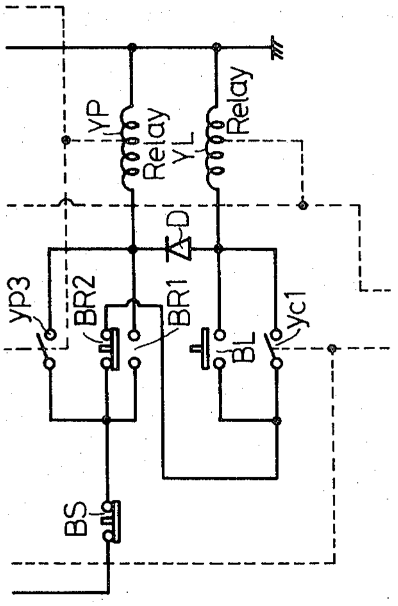
FIG. 3 is a circuit diagram illustrating a modified form of one part of the circuit depicted in FIG. 1.

Further, when the operation for starting the tape to right or left has been carried out, the motor 1 is supplied with a voltage higher than that during constant-speed tape translation until the pinch roller moves in rotary contact with the capstan, so that the capstan is promptly driven at a constant speed or a speed nearly equal thereto. This results in shortening of the time from the operation for starting the tape to the rotary contact of the pinch roller with the capstan, that is, actual start of the tape translation. With such an arrangement as described in the foregoing, even if the switches BR1, BR2 and BL are depressed simultaneously, the same results as those obtainable with simultaneous depression of the switches BR1 and BR2 are obtained because the switch BL is connected in series with that BR2. However, if the switches BR1, BR2 and BL are electromechanically constructed so that even in the case of simultaneous depression of the switches BR1, BR2 and BL, the switch BL may be turned on after or before the switches BR1 and BR2 are turned on and off respectively, the circuit construction may be identical with that of FIG. 1 except in that the switch BL is connected to the connection point of the switch BR2 and the contact yc1 instead of the connection point of the switches BS, BR1 and BR2, as shown in FIG. 3.

Although the foregoing description has been given in connection with the case where the direction of travel of the tape while running is automatically reversed by utilizing the conductive foil of the tape without operating the push-button switches, it is also possible that where the tape retained at both ends to the reels stops after it has been completely taken up on one reel from the other, the stoppage of the tape is detected and the detected signal is rendered into a signal similar to the aforementioned one for energization of the control relay YC.

It will be apparent that many modifications and variations may be effected without departing from the scope of the novel concepts of this invention.

I claim as my invention

1. A magnetic tape drive control apparatus for magnetic tape recorders comprising a plunger solenoid for bringing a pinch roller into or out of rotary contact with a capstan with a magnetic tape being gripped therebetween, switching means having a control terminal, a relay having a normally closed contact and connected to a power source through said switching means, a switch turned on by an operation for driving said magnetic tape selectively in first and second directions, first and second charging and discharging capacitors shorted and non-shorted respectively during travelling of the magnetic tape in said first direction and thereafter non-shorted and shorted respectively by the operation for driving the magnetic tape in said second direction, said plunger solenoid being connected to said power source through said normally closed contact of the relay and said switch, said control terminal of the switching means being connected to said power source through said first and second charging and discharging capacitors connected in series to each other, said switching means being controlled to be in the on state based upon a charging current to said first charging and discharging capacitor when the latter is altered from its shorted condition to the non-shorted condition, in which, when the operation is achieved for altering the direction of travel of the tape from said first to said second direction, the plunger solenoid is held deenergized until the charging current to the first charging and discharging capacitor stops or becomes lower than a predetermined level thereof from the time of said operation for altering the direction of travel of the tape, and then the plunger solenoid is energized.

2. A magnetic tape drive control apparatus for magnetic tape recorders as claimed in claim 1, which includes means for supplying the series-connected first and second charging and discharging capacitors with a voltage higher than that during the standstill condition of the tape based upon the voltage of said power source when the operation is achieved for driving the magnetic tape selectively in the first and second directions.

3. A magnetic tape drive control apparatus for magnetic tape recorders as claimed in claim 1, which includes a motor for driving said capstan, a power source producing a first voltage and a second voltage higher than the former, and means for supplying said motor with the second voltage only when the relay is energized and with the first voltage except when the operation for maintaining the tape in its standstill condition and except when the relay is energized.

4. A magnetic tape drive control apparatus for magnetic tape recorders as claimed in claim 3, wherein said first and second voltage supplying means includes contacts of said relay.

5. A magnetic tape drive control apparatus for magnetic tape recorders comprising a first normally open contact shorted by a conductive foil attached to a magnetic tape when said magnetic tape is driven in a first direction, a second normally open contact shorted by a conductive foil attached to said magnetic tape when said magnetic tape is driven in a second direction, a first switching transistor controlled by closing of said first normally open contact to be in the off state from the on state, a second switching transistor controlled by closing of said second normally open contact to be in the off state from the on state, a third switching transistor controlled to be in the on state from the off state by turning-off of said first switching transistor when said second switching transistor is in the on state and to be controlled to be in the off state from the on state by turning-off of said second switching transistor, and a tape drive control circuit for controlling the direction of travel of said magnetic tape to said first direction when said third switching transistor is in the off state and controlling the direction of travel of said magnetic tape to said second direction when said third switching transistor is in the on state.

6. A magnetic tape drive control apparatus for magnetic tape recorders comprising means for changing the direction of travel of a magnetic tape, a switching transistor, means responsive to the output from said switching transistor, control means for controlling said tape travelling direction changing means with the output from said responsive means, a charging capacitor connected to a power source through a resistor and to the input of said switching transistor, and normally open contacts connected across said charging capacitor and shorted by a conductive foil attached to said magnetic tape, in which said charging capacitor is normally charged by said power source through said resistor and discharged when the normally open contacts are shorted by said conductive foil and in which said switching transistor is normally held in on state by the normally charged voltage of the charging capacitor and said switching transistor is put in the off state upon discharging of the charging capacitor and held in the off state for a period of time determined by the capacitance of said charging capacitor and the resistance of said resistor after the contacts are brought out of their shorted condition.

* * * * *